US011358090B2

(12) United States Patent
Merritt

(10) Patent No.: US 11,358,090 B2
(45) Date of Patent: Jun. 14, 2022

(54) FLUID FILTER

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 853 days.

(21) Appl. No.: 13/613,685

(22) Filed: Sep. 13, 2012

(65) Prior Publication Data

US 2013/0008844 A1    Jan. 10, 2013

Related U.S. Application Data

(63) Continuation of application No. PCT/US2011/028498, filed on Mar. 15, 2011.

(60) Provisional application No. 61/314,787, filed on Mar. 17, 2010.

(51) Int. Cl.
*B01D 29/00* (2006.01)
*B01D 46/24* (2006.01)
*B01D 46/00* (2022.01)

(52) U.S. Cl.
CPC ..... *B01D 46/2418* (2013.01); *B01D 46/0005* (2013.01); *B01D 2271/022* (2013.01)

(58) Field of Classification Search
CPC ............. B01D 46/527; B01D 46/0005; B01D 2201/0415; B01D 46/2418; B01D 2271/022; B01D 25/24; B01D 46/0004; B01D 2271/027
See application file for complete search history.

(56) References Cited

U.S. PATENT DOCUMENTS

| 4,155,980 A | 5/1979 | Santiago et al. |
| 5,772,883 A | 6/1998 | Rothman et al. |
| 5,792,247 A | 8/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,235,195 B1 | 5/2001 | Tokar |
| D450,827 S | 11/2001 | Gieseke et al. |

(Continued)

FOREIGN PATENT DOCUMENTS

| DE | 202006001440 U1 | 7/2007 |
| EP | 1 850 941 A2 | 8/2006 |

(Continued)

OTHER PUBLICATIONS

Oxford Dictionary, "The Concise Oxford Dictionary, Tenth Edition," ed. Judy Pearsall, Oxford University Press, New York, 1999, 3 pages. (Year: 1999).*

(Continued)

*Primary Examiner* — Bobby Ramdhanie
*Assistant Examiner* — Denise R. Anderson
(74) *Attorney, Agent, or Firm* — Reinhart Boerner Van Deuren P.C.

(57) ABSTRACT

A straight-through flow filter element is provided in which an L-shaped ring is spaced from one of the inlet and outlet flow faces. The seal member may extend therefrom in a cantilevered manner away from one of the flow faces. The spacing may be facilitated by way of spacer elements which may contact the flow face and thereby also support the flow face toward the outer perimeter.

22 Claims, 2 Drawing Sheets

(56) References Cited

U.S. PATENT DOCUMENTS

| | | | |
|---|---|---|---|
| D450,828 S | 11/2001 | Tokar | |
| 6,348,084 B1 | 2/2002 | Gieseke et al. | |
| 6,368,374 B1 | 4/2002 | Tokar et al. | |
| D460,169 S | 7/2002 | Anderson et al. | |
| 6,416,605 B1 | 7/2002 | Golden | |
| 6,517,598 B2 | 2/2003 | Anderson et al. | |
| 6,533,845 B2 | 3/2003 | Tokar et al. | |
| D473,637 S | 4/2003 | Golden | |
| 6,610,126 B2 | 8/2003 | Xu et al. | |
| D484,584 S | 12/2003 | Anderson et al. | |
| 6,673,136 B2 | 1/2004 | Gillingham et al. | |
| 6,783,881 B2 | 8/2004 | Stenersen et al. | |
| 6,852,141 B2 | 2/2005 | Bishop et al. | |
| 6,966,940 B2 | 11/2005 | Krisko et al. | |
| 7,008,465 B2 | 3/2006 | Graham et al. | |
| 7,179,317 B2 | 2/2007 | Chung et al. | |
| 7,255,300 B2 | 8/2007 | Johnston | |
| 7,261,756 B2 | 8/2007 | Merritt | |
| 7,282,075 B2 | 10/2007 | Sporre et al. | |
| 7,318,851 B2 * | 1/2008 | Brown | B29C 70/68 95/286 |
| 7,323,029 B2 | 1/2008 | Engelland et al. | |
| 7,329,326 B2 | 2/2008 | Wagner et al. | |
| 7,364,601 B2 | 4/2008 | Xu et al. | |
| 7,396,375 B2 | 7/2008 | Nepsund et al. | |
| 7,396,376 B2 | 7/2008 | Schrage et al. | |
| 7,488,365 B2 | 2/2009 | Golden et al. | |
| 7,491,254 B2 | 2/2009 | Krisko et al. | |
| 7,569,090 B2 | 8/2009 | Nelson | |
| 7,625,419 B2 | 12/2009 | Nelson et al. | |
| 7,655,074 B2 | 2/2010 | Nepsund et al. | |
| 7,674,308 B2 | 3/2010 | Krisko et al. | |
| 7,682,416 B2 | 3/2010 | Engelland et al. | |
| 7,713,321 B2 | 5/2010 | Kuempel et al. | |
| 7,736,410 B2 | 6/2010 | Kuempel et al. | |
| 7,753,982 B2 * | 7/2010 | Merritt | B01D 46/527 96/380 |
| 7,905,936 B2 | 3/2011 | Coulonvaux et al. | |
| 7,909,954 B2 | 3/2011 | Johnston et al. | |
| 7,931,725 B2 * | 4/2011 | Wydeven | B01D 46/527 55/497 |
| 7,959,701 B2 | 6/2011 | Merritt | |
| 7,959,703 B2 * | 6/2011 | Merritt | B01D 46/0005 55/498 |
| 8,042,694 B2 | 10/2011 | Driml et al. | |
| 8,092,748 B2 | 1/2012 | Forster et al. | |
| 8,101,003 B2 | 1/2012 | Krisko et al. | |
| 8,172,920 B2 | 5/2012 | Merritt | |
| 8,177,877 B2 | 5/2012 | Merritt et al. | |
| 8,277,531 B2 * | 10/2012 | Brown | F02M 35/0203 55/501 |
| 8,673,043 B2 * | 3/2014 | Merritt | B01D 46/527 422/177 |
| 9,890,750 B2 * | 2/2018 | Brown | B01D 46/0005 |
| 9,932,943 B2 * | 4/2018 | Brown | B01D 46/0002 |
| 2001/0036427 A1 | 11/2001 | Yamada et al. | |
| 2005/0208348 A1 | 9/2005 | Canepa | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091084 A1 | 5/2006 | Merritt et al. | |
| 2006/0163150 A1 | 7/2006 | Golden et al. | |
| 2006/0186031 A1 | 8/2006 | Fick et al. | |
| 2007/0039296 A1 | 2/2007 | Schrage et al. | |
| 2007/0169449 A1 | 7/2007 | Merritt | |
| 2007/0186528 A1 | 8/2007 | Wydeven et al. | |
| 2007/0193236 A1 | 8/2007 | Merritt | |
| 2008/0000826 A1 | 1/2008 | Harder et al. | |
| 2008/0016832 A1 | 1/2008 | Krisko et al. | |
| 2008/0060329 A1 | 3/2008 | Brown et al. | |
| 2008/0110142 A1 | 5/2008 | Nelson et al. | |
| 2008/0135470 A1 | 6/2008 | Merritt et al. | |
| 2008/0135471 A1 | 6/2008 | Merritt et al. | |
| 2008/0250763 A1 | 10/2008 | Widerski et al. | |
| 2008/0250766 A1 | 10/2008 | Schrage et al. | |
| 2008/0276582 A1 | 11/2008 | Boehrs et al. | |
| 2008/0282890 A1 | 11/2008 | Rocklitz et al. | |
| 2009/0014375 A1 | 1/2009 | Savage et al. | |
| 2009/0064646 A1 | 3/2009 | Reichter et al. | |
| 2009/0114590 A1 | 5/2009 | Merritt et al. | |
| 2009/0127211 A1 | 5/2009 | Rocklitz et al. | |
| 2009/0145093 A1 | 6/2009 | Krisko et al. | |
| 2009/0151311 A1 | 6/2009 | Reichter | |
| 2009/0211450 A1 | 8/2009 | Mosset et al. | |
| 2009/0211696 A1 | 8/2009 | Moe et al. | |
| 2009/0223187 A1 | 9/2009 | Nelson et al. | |
| 2009/0229458 A1 | 9/2009 | Feddersen et al. | |
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0032365 A1 | 2/2010 | Moe et al. | |
| 2010/0043366 A1 | 2/2010 | Boehrs et al. | |
| 2010/0078379 A1 | 4/2010 | Rocklitz | |
| 2010/0146919 A1 | 6/2010 | Nelson et al. | |
| 2010/0192530 A1 * | 8/2010 | Wydeven | B01D 46/527 55/488 |
| 2010/0233048 A1 | 9/2010 | Dallas et al. | |
| 2010/0242425 A1 | 9/2010 | Swanson et al. | |
| 2010/0263337 A1 | 10/2010 | Raether et al. | |
| 2010/0293906 A1 | 11/2010 | Flagstad et al. | |
| 2011/0041692 A1 | 2/2011 | Raether | |
| 2011/0042295 A1 | 2/2011 | Merritt | |
| 2011/0072972 A1 | 3/2011 | Raether et al. | |
| 2011/0078985 A1 | 4/2011 | Belcher et al. | |
| 2011/0083559 A1 | 4/2011 | Raether | |
| 2011/0197556 A1 | 8/2011 | Brown et al. | |
| 2012/0000170 A1 | 1/2012 | Brown et al. | |
| 2012/0205305 A1 | 8/2012 | Brown et al. | |

FOREIGN PATENT DOCUMENTS

| | | |
|---|---|---|
| EP | 1 976 615 A2 | 8/2007 |
| WO | WO 2005/058461 A1 | 6/2005 |
| WO | WO 2005/077487 A1 | 8/2005 |
| WO | WO 2005/082484 A1 | 9/2005 |
| WO | WO 2006/014941 A2 | 2/2006 |
| WO | WO 2007/009039 A1 | 1/2007 |
| WO | WO 2008/045325 A2 | 4/2008 |
| WO | WO 2009/012189 A2 | 1/2009 |
| WO | WO 2009/039285 A1 | 3/2009 |
| WO | WO 2009/059177 A1 | 5/2009 |
| WO | WO 2009/100115 A2 | 8/2009 |
| WO | WO 2009/124284 A2 | 10/2009 |
| WO | WO 2010/011628 A2 | 1/2010 |
| WO | WO 2010/025385 A1 | 3/2010 |
| WO | WO 2010/054218 A1 | 5/2010 |
| WO | WO 2010/083194 A2 | 7/2010 |
| WO | WO 2010/114911 A1 | 10/2010 |
| WO | WO 2010/117606 A2 | 10/2010 |
| WO | WO 2011/017352 A2 | 2/2011 |
| WO | WO 2011/076586 A1 | 6/2011 |
| WO | WO 2011/115973 A2 | 9/2011 |
| WO | WO 2011/115979 A2 | 9/2011 |

OTHER PUBLICATIONS

U.S. Appl. No. 13/613,574, Merritt, Sep. 13, 2012.

* cited by examiner

FLUID FILTER

CROSS-REFERENCE TO RELATED PATENT APPLICATIONS

This patent application is a continuation of co-pending PCT/US2011/028498, filed Mar. 15, 2011, designating the United States, which claims the benefit of U.S. Provisional Patent Application No. 61/314,787, filed Mar. 17, 2010, the entire teachings and disclosure of which are incorporated herein by reference thereto.

FIELD OF THE INVENTION

This invention relates generally to fluid filters and more particularly to the sealing systems of such fluid filters and particularly inline straight-through flow filter media packs including fluted filter media packs.

BACKGROUND OF THE INVENTION

Filters of the type used for filtering particulate matter from fluids sometimes include a filter housing having an inlet for receiving the fluid entrained with particulate matter and an outlet for delivering the filtered fluid to a device needing fluid that is free of particulate matter. For example, a filter may be provided at the air inlet of an engine, a cabin ventilation system, an air compressor, an HVAC system, and industrial air collection system or the like to remove dust or other particulate matter that could cause damage.

In such filters, the particulate matter is typically removed by a filter element that is removably installed within the filter housing in such a manner that the fluid must flow first through a filter element. In some systems, the filter element is simply placed between upstream and downstream duct sections. In either case, the filter element may or may not include its own housing. In either case and over time, the filter pack of the filter element becomes plugged or coated with particulate matter, necessitating removal and replacement of the filter element in order for the filter to continue in its function of supplying particulate free fluid to the given application.

There is also known in the art to use a variety of different filter packs included pleated filter packs and fluted filter packs, both of which can be configured as straight-through flow type filter pack. For example, a fluted filter media has opposed inlet and outlet flow faces and an outer peripheral surface extending between the inlet and outlet faces. The fluted filter media comprises multiple flutes extending between the inlet and outlet flow faces with alternating flutes being closed at either the inlet or outlet ends such that some flutes are open at the inlet face and closed at the outlet face while other flutes are open at the outlet face and closed at the inlet face. In this manner, fluid is forced to traverse through the filter media as the fluid flows from the inlet face to the outlet face. Examples of such fluted filter media arrangements and filter elements incorporating the same are shown, for example in U.S. Pat. No. 7,318,851 and Publication Nos. US/2007/0186528; 2007/0193236; and US/2006/0091061, all assigned to the present assignee, and all of which have disclosures which are hereby incorporated by reference in their entirety to the extent not inconsistent with the present disclosure. Details therein can be applicable or combined with the present disclosed embodiments.

Often times, in an existing application there is already an existing envelope in which a filter element must reside and sealed against. Accordingly, some filter element designs may be required to fit a given envelope size. Additionally, in some cases, it may be desirable for a given filter element to fit or seal against different housing or application arrangements. While various filter element and sealing system arrangements are known generally within the prior art, the present invention is directed toward various improvements.

BRIEF SUMMARY OF THE INVENTION

An aspect of the present invention is directed toward a filter element comprising a straight-through flow filter media (such as fluted filter media pack or a panel type filter media pack) with inlet and outlet flow faces on opposed ends thereof and an outer peripheral surface extending between opposed ends. The straight-through flow filter media is adapted to be placed in line in a fluid stream substantially without redirecting the flow of that fluid. The generally L-shaped ring has a first leg extending over the outer peripheral surface and a second leg extending over one of the inlet and outlet faces. The second leg extends toward a center of the fluted filter media in generally parallel and space relation to one of the inlet and outlet flow faces forming a generally annular gap therebetween (by generally it is meant to be parallel or about parallel as it is appreciated that perfectly parallel is not critical). A seal member is attached to the seal support ring.

Advantages that may flow from embodiments disclosed herein are that the L-shaped ring may support the filter media while at the same time facilitating and not restricting fluid flow by being sized and configured appropriately as well as spaced sufficient from one of the flow faces. Further, a very simple design is facilitated allowing for different materials to be potentially used for the L-shaped ring. Further, despite a simple design it also adequately provides for support of a seal member which may also be cantilevered and provide for a radial seal with an appropriate housing. The seal interface with the support ring may include such things as a heat treatment (such as in the case of it being plastic) or the application of a primer, adhesive or softening material such as a solvent to better facilitate attachment of a seal member to the seal support ring.

As certain preferred embodiments, flow is not inhibited but facilitated by dimensional considerations. Specifically, the annular gap between the L-shaped ring and the flow face is sufficiently large enough so that flow is generally not restricted such as in the case of an air flow screen. Further, the inner perimeter of the second leg of the seal support member is relatively large and typically greater than at least one-half of the outer perimeter of the overall L-shaped ring. This provides a sufficiently large hole to facilitate fluid flow again generally without any noticeable air flow restriction for a given application. Spacer elements may also be employed to space the L-shaped ring from the flow face.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The first embodiment is illustrated in FIGS. 1-5. As shown therein, an inline straight-through flow type filter element such as a fluted filter element 10 can be mounted at least partially within a housing 12. As shown, the housing 12 may be an existing housing for engines and as such has a given or fixed envelope size, a predetermined sealing interface, as well as a fixed mounting structure. As such, the filter element 10 is designed to utilize this given mounting structure, sealing interface, and pre-determined envelope.

Figure 1:
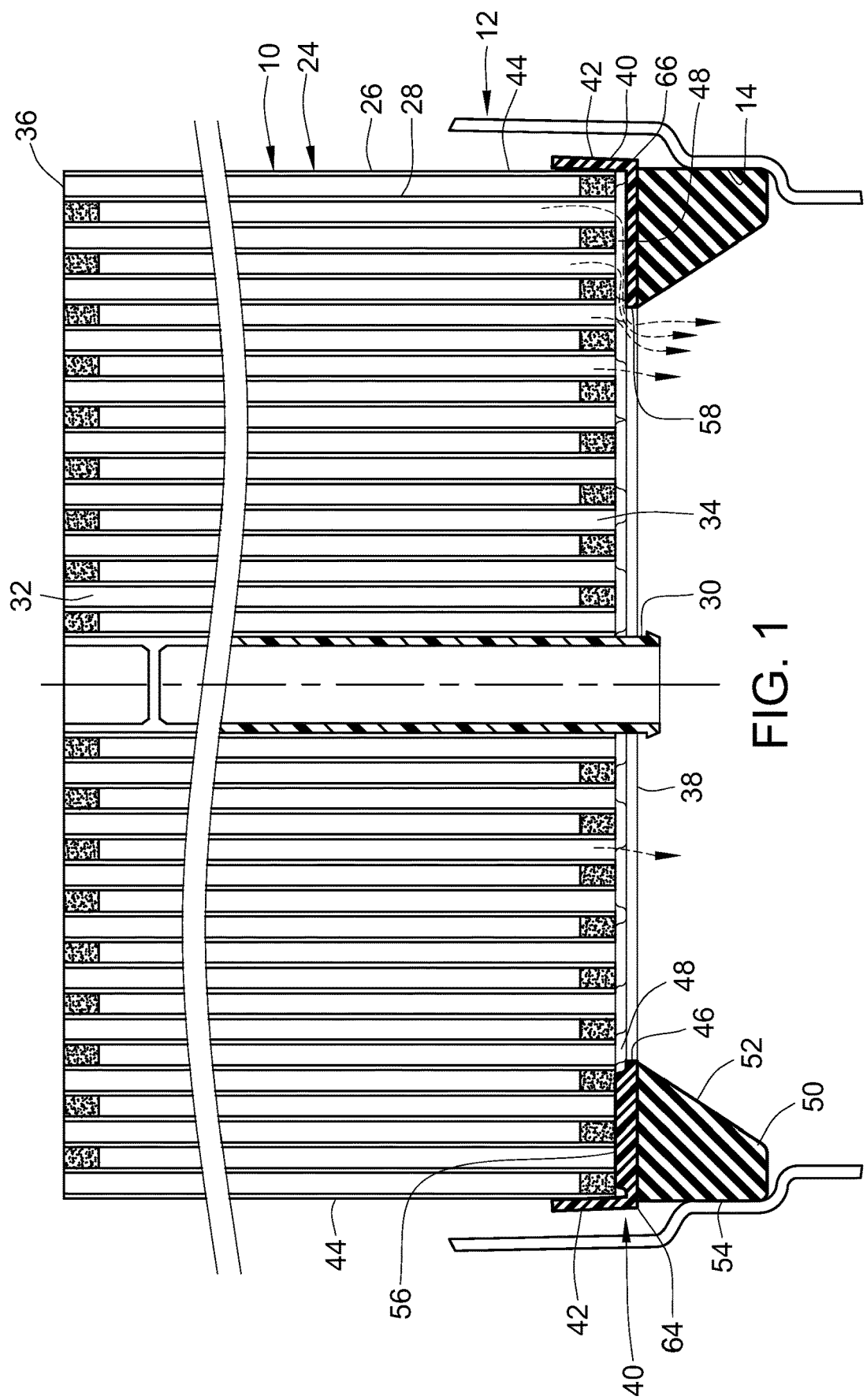
FIG. 1 is a cross sectional illustration of a filter element as employed in the environment of a housing and radial seal engagement therewith with a portion of the housing being illustrated, in accordance with an embodiment of the present invention.

As shown in FIG. 1, the housing 12 includes an internal annular housing sealing surface 14 against which the filter element 10 may seal through compression of the seal material between the filter element and the housing. In this instance, the housing sealing surface 14 is such that the filter element 10 may form a radial seal therewith, but it may also or alternatively axially seal. As shown, the housing sealing surface 14 may also be disposed radially inward from the inner perimeter of the upper end or upper opening of the housing 12 into which the filter element 10 may be installed and removed.

As shown, the filter element 10 includes a straight-through flow filter media such as a fluted filter media pack 24, although it is equally applicable to other such inline flow filters such as a pleated filter pack to include panel filters and the like, which may have various annular shapes, which herein is meant to be broad to include oval, racetrack, round, oblong and even rectangular in that it forms a continuous loop. The filter element 10 preferably employs fluted filter media which is known to provide increased capacity in a given envelope.

In this regard and according to certain embodiments, fluted filter media pack 24 includes a base sheet 26 and a fluted sheet 28 secured together and wound about a winding core 30 to provide a plurality of flutes including inlet flutes 32 and outlet flutes 34 that extend between inlet and outlet flow faces 36, 38. As shown, the inlet flutes are open at the inlet flow face 32 and closed at the outlet flow face; while the outlet flutes 34 are closed at the inlet flow face 36 and open at the outlet flow face 38. In this manner, fluid entering the inlet flow face enters the inlet flow face and must traverse through the filter media (either the base sheet or the fluted sheet) as fluid flows from the inlet flow face to the outlet flow face. As a consequence of flowing through the filter media of either the fluted sheet or base sheet, particulate matter, such as dust and the like is thereby removed from the fluid stream. For example, dust or the like in an air flow stream will then be trapped in the filter media of either the base sheet or the fluted sheet. As shown in FIG. 1, the fluted filter media pack 24 may be generally circular, but other shapes for the first embodiment may be contemplated including such as oval or race-track shaped or rectangular (all of which may be considered annular under the present disclosure) in which other structures similarly associated with FIG. 1 would take a similar shape.

As also shown, the filter element 10 includes a generally L-shaped ring which may be formed of metal, plastic or other more rigid material (in contrast to the seal member which is typically a soft resilient material). The ring 40 includes a first outer leg 42 that extends around the outer peripheral surface 44 of the fluted filter media pack 24 in complete surrounding relation thereof preferably in a preferred embodiment. Additionally, a second leg 46 extends radially over one of the inlet and outlet flow faces 36, 38. As can be seen in FIG. 1 particularly by the right-side of the illustration, an annular gap 48 is formed between the support ring 40 and the outlet flow face 34 due to the fact that the second leg 46 is spaced a distance from the outlet flow face 38 to facilitate flow therebetween and utilized the filtration capacity of the outer flutes toward the outer peripheral surface 44 of the fluted filter media pack 24. As shown, the second leg 46 extends preferably in a generally parallel end spaced relation to one of the inlet and outlet flow faces (which is intended to include a slight cant one way or another—hence the term "generally" is used).

Additionally, a seal member 50 is attached to the L-shaped ring 40. In one embodiment, the seal member is a molded urethane member that may be molded directly onto the second leg and may project therefrom in a cantilevered manner in a direction away from the fluted filter media. To facilitate better attachment, and if the L-shaped ring 40 is plastic, the material of the ring at the attachment surface may be softened slightly either through an appropriate solvent and/or through heat treatment or the like to facilitate better bonding at that location or the surface may be roughened or include grooves surface features or the like to facilitate attachment of the seal member. All of the foregoing may be considered to be molding assistance means for enhancing attachment of a molded seal member to the second leg of the L-shaped ring. As also shown with reference to FIG. 1, the seal member includes both an inner peripheral surface and an outer peripheral surface 52, 54 other of which may form a radial seal as well as a terminating end surface that is capable of forming an axial seal. As shown in FIG. 1, the filter element 10 is employed in an outward radial seal configuration with an appropriate housing 12 which may be a existing housing such that the present filter element 10 may serve as a replacement filter element.

Further, by not having any sort of backing, the seal member may be much thicker and resilient in character such that it can flex more easily into and out of position. Thus, there is an advantage to the generally cantilever extending nature of seal member 50.

Figure 2:
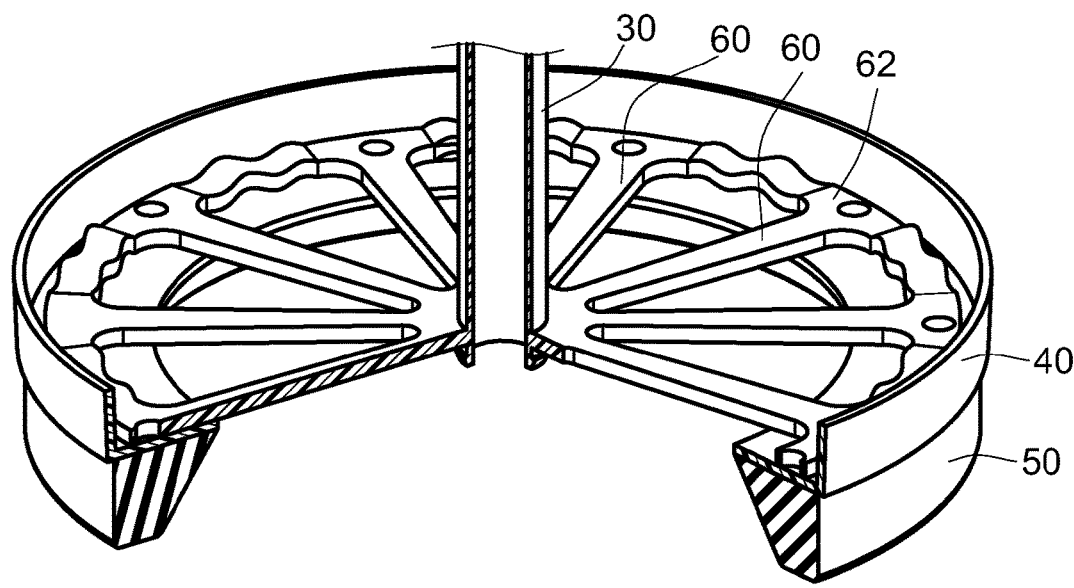
FIGS. 2 and 3 are alternative embodiments and similar asymmetric and partially cut-away views of the seal support ring, seal member and other applicable components that may be employed on a filter element as used in FIG. 1.
Figure 3:
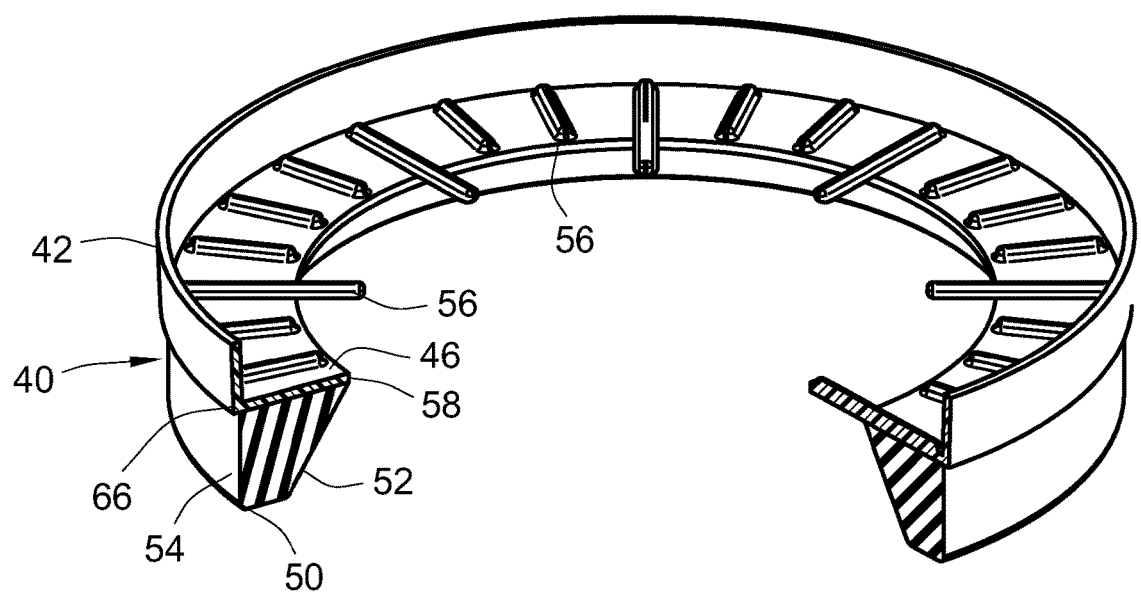

With reference to FIG. 3 (and FIG. 2), other optional features are that shown in all of the embodiments may be that spacer elements 56 may be employed in the annular gap 48 that contact one of the inlet and outlet flow faces and provide flow paths between adjacent spacer elements. The spacer elements ensure proper spacing of the L-shaped ring from the flow face of the filter media pack. Preferably, these stop short and do not extend across the end face of the filter element. These spacer elements 56 may also support the outer wraps of the fluted filter media pack 24 and prevent telescoping thereof, by contact as shown in FIG. 1. As such, the spacer elements 56, or some of the selected ones, may also extend in a cantilever manner inward over an inner perimeter 58 of the second leg 46 as shown in FIG. 3. Also, as shown, the spacer elements 56 in FIGS. 1 and 3 may be conveniently formed integrally as a part of the second leg 46 of the L-shaped ring 40.

Alternatively, as shown in FIG. 2, the spacer elements 56 may be provided as spokes 60 extending outward and integrally from a winding core 30 upon which the fluted filter media pack 24 may be coiled. The spokes 60 may get trapped between the L-shaped ring 40 and the fluted filter media pack 24, thereby providing spacing therebetween. Further, in this embodiment of FIG. 2, an outer corrugated rim 62 which provides flow paths within corrugations may connect the outer periphery of the spokes for support while facilitating fluid flow at this region. The rim 62 need not be as wide and can be relatively thin in nature.

Preferably, the seal member 50 is also constrained within a perimeter and does not extend over the first leg 42. This can facilitate molding by allowing a pinch point or location where the ring interfaces with a mold to be proximate a corning 64 between the legs 42 and 46.

An advantage of this design is that it is relatively simple but yet the spacing affords the fact that flow is generally not restricted or subject to a noticeable pressure drop due to the L-shaped ring 40. For example, as shown, the second leg as an inner perimeter 58 and an outer perimeter 66 in which the inner perimeter is at least half of the outer perimeter to provide for substantial fluid flow through the opening defined within the inner perimeter. Additionally, the spacer elements 56 may have a maximum axial span that is less then four times the thickness of the second leg 46. As shown, the spacer elements 56 may be formed by spokes or as also shown rip-to-like structures/bosses.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
   a straight-through flow filter media with inlet and outlet flow faces on opposed ends thereof and an outer peripheral surface extending between opposed ends, the straight-through flow filter media adapted to be placed in-line in a fluid stream substantially without redirecting the flow;
   a generally L-shaped ring having a first leg extending over the outer peripheral surface and a second leg extending over one of the inlet and outlet faces, the second leg extending radially inward from the first leg toward a center of the straight-through flow filter media in generally parallel and spaced relation to one of the inlet and outlet faces forming a generally annular gap therebetween, the second leg having a first face which faces one of the inlet and outlet faces, and a second face in a parallel opposed spaced relationship to the first face; and
   a seal member having first and second axial ends, and a seal portion defining a radially outwardly facing sealing surface extending between the first and second axial ends, the first axial end of the seal member being attached to the second face of the second leg of the generally L-shaped ring, said seal member extending axially outward from the second face of the second leg as a cantilevered extension;
   the filter element further comprising spacer elements in the generally annular gap contacting one of the inlet and outlet flow faces and, flow paths being formed between adjacent spacer elements;
   wherein the spacer elements include a first plurality of spacer elements and a second plurality of spacer elements;
   wherein the first plurality of spacer elements extend radially inward beyond an inner periphery of the second leg, and wherein the first plurality of spacer elements are not connected to one another, wherein the spacer elements of the first plurality of spacer elements are integrally formed with the second leg and are in direct contact with the first face of the second leg; and
   wherein the second plurality of spacer elements do not extend radially inward beyond the inner periphery of the second leg, and wherein the second plurality of spacer elements are not connected to one another, wherein the spacer elements of the second plurality of spacer elements are integrally formed with the second leg and are in direct contact with the first face of the second leg, wherein the spacer elements of the second plurality of spacer elements are positioned radially outward beyond the inner periphery of the second leg and are positioned between the first leg and the inner periphery of the second leg.

2. The filter element of claim 1, wherein the straight-through flow filter media is a fluted filter media, the fluted filter media comprising a plurality of flutes extending between inlet and outlet flow faces with portions of flutes being closed such that fluid transverses through the fluted filter media as fluid flows from the inlet flow face to the outlet flow face.

3. The filter element of claim 1, wherein the seal member is constrained within a perimeter of and does not extend over the first leg.

4. The filter element of claim 1, wherein the second leg has an inner perimeter and an outer perimeter, the inner perimeter being greater than ½ of the outer perimeter to provide for substantial fluid flow through the inner perimeter.

5. The filter element of claim 1, wherein seal member is a molded urethane member molded directly onto the second leg.

6. The filter element of claim 1, wherein the first and second pluralities of spacer elements radially converge toward a common center point defined by the inner periphery of the second leg.

7. The filter element of claim 1, wherein:
the second leg has a radial width that is greater than a thickness of the second leg, the thickness being measured between the first and second faces of the second leg and generally perpendicular to the inlet and outlet flow faces, the radial width being measured perpendicular to the thickness;
the first axial end of the seat member is in a face-to-face relationship with the second face of the second leg of the generally L-shaped ring; and
wherein the first axial end of the seal member is directly attached to the second face of the second leg of the generally L-shaped ring.

8. The filter element of claim 7, further comprising an adhesive securing the first end of the seat member to the second face of the second leg of the generally L-shaped ring.

9. The filter element of claim 1, wherein the seal member has an inner most peripheral surface and an outer most peripheral surface, the outer most peripheral surface providing the radially outwardly facing sealing surface, the first end of the seal member being defined between the inner and outer most peripheral surfaces;
the entirety of the first end of the seal member between the inner and outer most peripheral surfaces being in axial abutment with the second face of the second leg of the generally L-shaped ring.

10. The filter element of claim 1, wherein a portion of each of the spacer elements of the first plurality of spacer elements is positioned radially outward beyond the inner periphery of the second leg and is positioned between the first leg and the inner periphery of the second leg.

11. The filter element of claim 1, wherein the second plurality of spacer elements are angularly offset from the first plurality of spacer elements.

12. A filter element, comprising:
a straight-through flow filter media with inlet and outlet flow faces on opposed ends thereof and an outer peripheral surface extending between opposed ends, the straight-through flow filter media adapted to be placed in-line in a fluid stream substantially without redirecting the flow;
a generally L-shaped ring having a first leg extending over the outer peripheral surface and a second leg extending over one of the inlet and outlet faces, the second leg extending toward a center of the straight-through flow filter media in generally parallel and spaced relation to one of the inlet and outlet faces forming a generally annular gap therebetween, the second leg forming a right angle with the first leg; and
a seal member attached to the second leg of the generally L-shaped ring, said seal member extending from the second leg as a cantilevered extension, the seal member having a continuously tapered width along an entire axial length thereof, said continuously tapered width beginning at the interface of the seal member with the second leg and extending to a distal end of the seal member.

13. The filter element of claim 12, further comprising spacer elements in the generally annular gap contacting one of the inlet and outlet flow faces and, flow paths being formed between adjacent spacer elements.

14. The filter element of claim 13, wherein the spacer elements are integrally formed with the second leg.

15. The filter element of claim 12, wherein the spacer elements include a first plurality of spacer elements and a second plurality of spacer elements, wherein each of the first plurality of spacer elements has a greater radial length than each of the second plurality of spacer elements.

16. The filter element of claim 15, wherein the first plurality of spacer elements extend radially inward beyond an inner periphery of the second leg, and wherein the first plurality of spacer elements are not connected to one another, and wherein the second plurality of spacer elements do not extend radially inward beyond the inner periphery of the second leg, and wherein the second plurality of spacer elements are not connected to one another.

17. The filter element of claim 13, wherein the straight-through flow filter media is a fluted filter media, wherein the spacer elements are part of a winding core around which the fluted filter media is wound, the spacer elements extending outward as spokes.

18. The filter element of claim 17, further comprising a rim at an outer periphery of the spokes, the rim providing flow channels and being trapped between the fluted filter media and the second leg.

19. The filter element of claim 13, wherein the spacer elements have a maximum axial span that is less than 4 times a thickness of the second leg.

20. The filter element of claim 12, wherein the second leg has a first face which faces one of the inlet and outlet faces, and a second face in parallel opposed spaced relation to the first face, the seal member directly attached to the second face.

21. The filter element of claim 12, wherein the seal member has an inner most peripheral surface, the inner most peripheral surface tapering radially outward when moving from the interface to the distal end of the seal member.

22. A filter element, comprising:
a straight-through flow filter media with inlet and outlet flow faces on opposed ends thereof and an outer peripheral surface extending between opposed ends;
a generally L-shaped ring having a first leg extending over the outer peripheral surface and a second leg extending over one of the inlet and outlet faces, the second leg extending radially inward from the first leg toward a center of the straight-through flow filter media in generally parallel and spaced relation to one of the inlet and outlet faces forming a gap therebetween, the second leg having a first face which faces one of the inlet and outlet faces, and a second face in a parallel opposed spaced relationship to the first face, the first face being flat and free of projections; and
a seal member having first and second axial ends, and a seal portion, the first axial end of the seal member being attached to the second face of the second leg of the generally L-shaped ring in a face-to-face orientation, said seal member extending axially outward from the second face of the second leg as a cantilevered extension;

the filter element further comprising spacer elements in the gap contacting one of the inlet and outlet flow faces and, flow paths being formed between adjacent spacer elements;

wherein the spacer elements include a first plurality of spacer elements and a second plurality of spacer elements angularly spaced from the first plurality of spacer elements;

wherein the first plurality of spacer elements extend radially inward beyond an inner periphery of the second leg, and wherein the first plurality of spacer elements are not connected to one another, wherein the spacer elements of the first plurality of spacer elements are integrally formed with the second leg and project, at least in part, axially from the first face of the second leg toward the straight-through flow filter media; and wherein the second plurality of spacer elements are entirely radially outward of the inner periphery of the second leg, and wherein the second plurality of spacer elements are not connected to one another, wherein the spacer elements of the second plurality of spacer elements are integrally formed with the second leg and project axially from the first face of the second leg toward the straight-through flow filter media, wherein the spacer elements of the second plurality of spacer elements are positioned between the first leg and the inner periphery of the second leg.

* * * * *

UNITED STATES PATENT AND TRADEMARK OFFICE
CERTIFICATE OF CORRECTION

PATENT NO. : 11,358,090 B2  
APPLICATION NO. : 13/613685  
DATED : June 14, 2022  
INVENTOR(S) : Merritt Page 1 of 1

It is certified that error appears in the above-identified patent and that said Letters Patent is hereby corrected as shown below:

In the Claims

Column 7 Line 4, Claim 4, reads "The filler element of claim 1, wherein the second leg" should read --The filter element of claim 1, wherein the second leg--

Column 7 Line 23, Claim 7, reads "the first axial end of the seat member is in a face-to-face" should read --the first axial end of the seal member is in a face-to-face--

Column 7 Line 30, Claim 8, reads "adhesive securing the first end of the seat member to the" should read --adhesive securing the first end of the seal member to the--

Signed and Sealed this  
Ninth Day of August, 2022

Katherine Kelly Vidal  
*Director of the United States Patent and Trademark Office*